United States Patent
Rimini et al.

(10) Patent No.: US 12,207,204 B2
(45) Date of Patent: Jan. 21, 2025

(54) ENHANCED RADIO WAVE EXPOSURE MITIGATION USING A COMBINATION OF PROXIMITY AND INERTIAL SENSOR DATA

(71) Applicant: QUALCOMM Incorporated, San Diego, CA (US)

(72) Inventors: Roberto Rimini, San Diego, CA (US); Udara Fernando, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/467,328

(22) Filed: Sep. 14, 2023

(65) Prior Publication Data

US 2024/0007965 A1    Jan. 4, 2024

Related U.S. Application Data

(63) Continuation of application No. 17/806,413, filed on Jun. 10, 2022, now Pat. No. 11,825,423, which is a continuation of application No. 17/224,715, filed on Apr. 7, 2021, now Pat. No. 11,395,238.

(51) Int. Cl.
*H04W 52/28* (2009.01)
*H04M 1/72454* (2021.01)

(52) U.S. Cl.
CPC ..... *H04W 52/285* (2013.01); *H04M 1/72454* (2021.01); *H04W 52/283* (2013.01); *H04M 2250/12* (2013.01)

(58) Field of Classification Search
CPC ............. H04W 52/285; H04W 52/283; H04M 1/72454; H04M 2250/12
See application file for complete search history.

(56) References Cited

U.S. PATENT DOCUMENTS

| | | |
|---|---|---|
| 8,886,247 B1 | 11/2014 | Price et al. |
| 8,989,792 B1 | 3/2015 | Depew |
| 10,578,640 B2 | 3/2020 | Lefebvre |
| 10,727,888 B2 | 7/2020 | Fernando et al. |
| 11,395,238 B1 | 7/2022 | Rimini |

(Continued)

FOREIGN PATENT DOCUMENTS

CA    2812011 A1    5/2008

OTHER PUBLICATIONS

International Search Report and Written Opinion PCT/US2022/071049—ISA/EPO—May 24, 2022.

(Continued)

*Primary Examiner* — Keith Ferguson
(74) *Attorney, Agent, or Firm* — QUALCOMM Incorporated

(57) ABSTRACT

Some disclosed devices include an inertial sensor system, a proximity sensor system, an antenna system configured to transmit and receive radio signals and a control system. The control system may be configured for receiving inertial sensor data from the inertial sensor system and controlling the proximity sensor system and/or the antenna system based, at least in part, on the inertial sensor data. In some examples, the control system may be configured for controlling the proximity sensor system and/or the antenna system based, at least in part, on whether the inertial sensor data indicates that the device is being held, is being carried or is on a person's body (e.g., is in the person's pocket).

20 Claims, 10 Drawing Sheets

(56) References Cited

U.S. PATENT DOCUMENTS

| | | |
|---|---|---|
| 2013/0156080 A1 | 6/2013 | Cheng et al. |
| 2015/0017935 A1 | 1/2015 | Sundaram |
| 2016/0091965 A1 | 3/2016 | Wang et al. |
| 2017/0244827 A1* | 8/2017 | Kang .................. H04L 67/55 |
| 2019/0019028 A1 | 1/2019 | Mese et al. |
| 2021/0005955 A1 | 1/2021 | Sudo et al. |
| 2022/0330172 A1 | 10/2022 | Rimini et al. |
| 2023/0100555 A1* | 3/2023 | Kang .................. H04B 7/0456 |
| | | 375/267 |

OTHER PUBLICATIONS

U.S. Appl. No. 17/224,715, Notice of Allowance dated May 12, 2022, 8 Pages.

U.S. Office Action dated Feb. 24, 2022, in U.S. Appl. No. 17/224,715, 11 Pages.

\* cited by examiner

FIGURE 3A
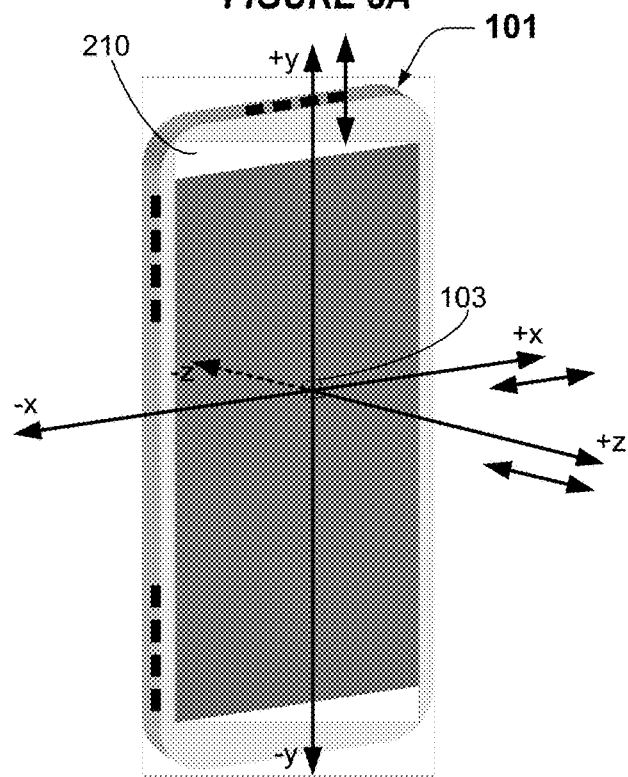
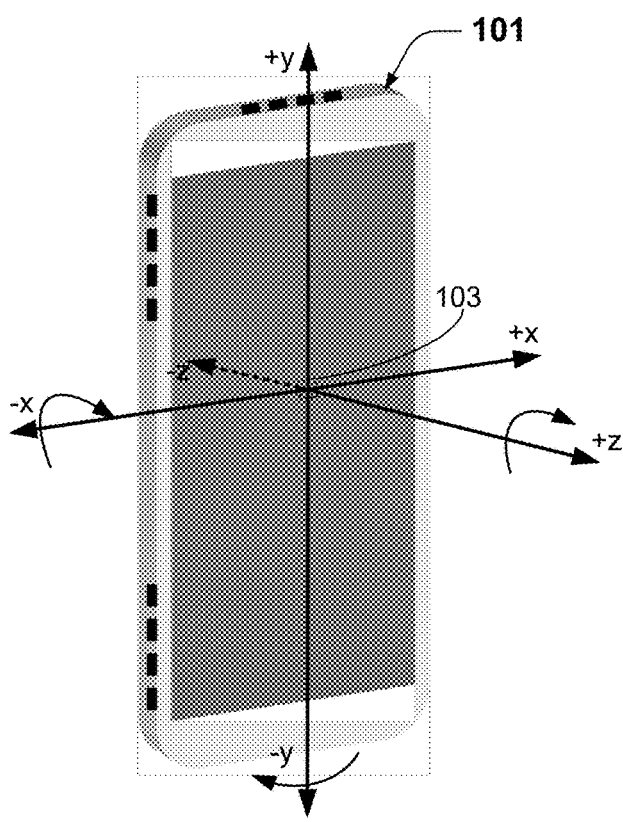
FIGURE 3B

ENHANCED RADIO WAVE EXPOSURE MITIGATION USING A COMBINATION OF PROXIMITY AND INERTIAL SENSOR DATA

PRIORITY CLAIM

This application claims priority to, and is a continuation of, U.S. patent application Ser. No. 17/806,413, entitled "ENHANCED RADIO WAVE EXPOSURE MITIGATION USING A COMBINATION OF PROXIMITY & INERTIAL SENSOR DATA" and filed on Jun. 10, 2022, which claims priority to, and is a continuation of, U.S. patent application Ser. No. 17/224,715, entitled "ENHANCED RADIO WAVE EXPOSURE MITIGATION USING A COMBINATION OF PROXIMITY & INERTIAL SENSOR DATA" and filed on Apr. 7, 2021, both of which are hereby incorporated in their entireties and for all purposes.

TECHNICAL FIELD

This disclosure relates generally to devices and methods for controlling human exposure to radio frequencies used for cellular systems.

DESCRIPTION OF THE RELATED TECHNOLOGY

Fifth generation (5G) cellular systems use various high-frequency bands of the electromagnetic spectrum, including frequency bands in the millimeter wave (mmW) region, to exploit the availability of large bandwidth and thereby to achieve unprecedented data rates. Radio transmissions at or above 6 GHz need to comply with the Maximum Permissible Exposure (MPE) requirements of the Federal Communications Commission (FCC), which sets a limit of 1 mW/cm$^2$. Although existing methods for controlling human exposure to high-frequency bands of the electromagnetic spectrum have merit, it would be desirable to develop improved methods and devices.

SUMMARY

The systems, methods and devices of the disclosure each have several innovative aspects, no single one of which is solely responsible for the desirable attributes disclosed herein.

One innovative aspect of the subject matter described in this disclosure may be implemented in an apparatus. The apparatus may include an inertial sensor system, a proximity sensor system, an antenna system and a control system that is configured for communication with the inertial sensor system, the proximity sensor system and the antenna system. The inertial sensor system may include one or more inertial sensors. The antenna system may be configured to transmit and receive radio signals. In some implementations, a mobile device may be, or may include, an apparatus as disclosed herein.

The control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. According to some examples, the control system may be configured for receiving inertial sensor data from the inertial sensor system and for controlling the proximity sensor system and the antenna system based, at least in part, on the inertial sensor data.

In some examples, the control system may be configured for determining whether the inertial sensor data indicates that the apparatus is being held, is being carried or is on a person's body. In some such examples, the control system may be configured for deactivating the proximity sensor system if the control system determines that the inertial sensor data indicates that the apparatus is being held, is being carried or is on the person's body. In some examples, the control system may be configured for lowering a transmission power of the antenna system if the control system determines that the inertial sensor data indicates that the apparatus is being held, is being carried or is on the person's body. In some instances, determining whether the apparatus is on the person's body may involve determining whether at least some of the apparatus is within a pocket of the person.

According to some examples, the control system may be configured for determining whether the inertial sensor data indicates that the apparatus is being held, is being carried or is on a person's body and for obtaining proximity sensor signals from the proximity sensor system if the control system determines that the inertial sensor data does not indicate that the apparatus is being held, is being carried or is on the person's body. In some such examples, the control system may be configured for determining whether the proximity sensor signals indicate that a target object is proximate the apparatus and for controlling a transmission power of the antenna system according to whether the control system determines that the target object is proximate the apparatus.

In some implementations, the inertial sensor system may include at least one accelerometer or at least one gyroscope. According to some implementations, the proximity sensor system may include at least one radar sensor. In some examples, the antenna system may be configured to transmit at least some radio signals at frequencies of 6 gigahertz or more. According to some implementations, the antenna system may be configured to transmit beamformed radio signals.

In some examples, the control system may be configured for determining whether the inertial sensor data indicates accelerations equal to or exceeding an acceleration threshold and for deactivating the proximity sensor system and/or lowering a transmission power of the antenna system if the control system determines that the inertial sensor data indicates one or more accelerations equal to or exceeding the acceleration threshold. According to some implementations, the control system may be configured for determining whether the inertial sensor data indicates micro-motions characteristic of human contact and for deactivating the proximity sensor system and/or lowering a transmission power of the antenna system if the control system determines that the inertial sensor data indicates one or more micro-motions characteristic of human contact.

According to some examples, the control system may be configured for implementing, via the control system, a neural network trained to determine whether the inertial sensor data indicates that the apparatus is being held, is being carried or is on a person's body. In some such implementations, the control system may be configured for deactivating the proximity sensor system and/or lowering a transmission power of the antenna system if the control system determines that the inertial sensor data indicates that the apparatus is being held, is being carried, or is on the person's body.

Still other innovative aspects of the subject matter described in this disclosure can be implemented in a method of controlling a mobile device. The method may involve receiving, by a control system of the mobile device, inertial sensor data from an inertial sensor system of the mobile device. The method may involve determining, by the control system, whether the inertial sensor data indicates that the mobile device is being held, is being carried or is on a person's body. The method may involve controlling, by the control system, a proximity sensor system and/or an antenna system of the mobile device based, at least in part, on whether the inertial sensor data indicates the mobile device is being held, is being carried or is on the person's body.

According to some examples, the method may involve deactivating, by the control system, the proximity sensor system if the control system determines that the inertial sensor data indicates that the mobile device is being held, is being carried or is on the person's body. In some examples, the method may involve lowering a transmission power of the antenna system if the control system determines that the inertial sensor data indicates that the mobile device is being held, is being carried or is on the person's body. According to some examples, determining whether the mobile device is on the person's body may involve determining whether at least some of the mobile device is within a pocket of the person.

In some examples, the method may involve obtaining proximity sensor signals from the proximity sensor system if the control system determines that the inertial sensor data does not indicate that the mobile device is being held, is being carried or is on the person's body. According to some examples, the method may involve determining whether the proximity sensor signals indicate that a target object is proximate the mobile device. In some examples, the method may involve controlling a transmission power of the antenna system according to whether the control system determines that the target object is proximate the mobile device.

According to some examples, the method may involve determining whether the inertial sensor data indicates accelerations equal to or exceeding an acceleration threshold. In some examples, the method may involve deactivating the proximity sensor system and/or lowering a transmission power of the antenna system if the control system determines that the inertial sensor data indicates one or more accelerations equal to or exceeding the acceleration threshold.

In some instances, the method may involve determining whether the inertial sensor data indicates micro-motions characteristic of human contact. According to some such examples, the method may involve deactivating the proximity sensor system and/or lowering a transmission power of the antenna system if the control system determines that the inertial sensor data indicates one or more micro-motions characteristic of human contact.

According to some examples, the method may involve implementing a neural network trained to determine whether the inertial sensor data indicates that the mobile device is being held, is being carried or is on the person's body. According to some such examples, the method may involve deactivating the proximity sensor system and/or lowering a transmission power of the antenna system if the control system determines that the inertial sensor data indicates that the mobile device is being held, is being carried, or is on the person's body.

Some or all of the operations, functions and/or methods described herein may be performed by one or more devices according to instructions (e.g., software) stored on non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented in a non-transitory medium having software stored thereon.

For example, the software may include instructions for controlling one or more devices to perform a method. The method may involve receiving, by a control system of the mobile device, inertial sensor data from an inertial sensor system of the mobile device. The method may involve determining, by the control system, whether the inertial sensor data indicates that the mobile device is being held, is being carried or is on a person's body. The method may involve controlling, by the control system, a proximity sensor system and an antenna system of the mobile device based, at least in part, on whether the inertial sensor data indicates the mobile device is being held, is being carried or is on the person's body.

According to some examples, the method may involve deactivating, by the control system, the proximity sensor system if the control system determines that the inertial sensor data indicates that the mobile device is being held, is being carried or is on the person's body. In some examples, the method may involve lowering a transmission power of the antenna system if the control system determines that the inertial sensor data indicates that the mobile device is being held, is being carried or is on the person's body. According to some examples, determining whether the mobile device is on the person's body may involve determining whether at least some of the mobile device is within a pocket of the person.

In some examples, the method may involve obtaining proximity sensor signals from the proximity sensor system if the control system determines that the inertial sensor data does not indicate that the mobile device is being held, is being carried or is on the person's body. According to some examples, the method may involve determining whether the proximity sensor signals indicate that a target object is proximate the mobile device. In some examples, the method may involve controlling a transmission power of the antenna system according to whether the control system determines that the target object is proximate the mobile device.

According to some examples, the method may involve determining whether the inertial sensor data indicates accelerations equal to or exceeding an acceleration threshold. In some examples, the method may involve deactivating the proximity sensor system and/or lowering a transmission power of the antenna system if the control system determines that the inertial sensor data indicates one or more accelerations equal to or exceeding the acceleration threshold.

In some instances, the method may involve determining whether the inertial sensor data indicates micro-motions characteristic of human contact. According to some such examples, the method may involve deactivating the proximity sensor system and/or lowering a transmission power of the antenna system if the control system determines that the inertial sensor data indicates one or more micro-motions characteristic of human contact.

According to some examples, the method may involve implementing a neural network trained to determine whether the inertial sensor data indicates that the mobile device is being held, is being carried or is on the person's body. According to some such examples, the method may involve deactivating the proximity sensor system and/or lowering a transmission power of the antenna system if the control system determines that the inertial sensor data indicates that the mobile device is being held, is being carried, or is on the person's body.

BRIEF DESCRIPTION OF THE DRAWINGS

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale Like reference numbers and designations in the various drawings generally indicate like elements.

FIGS. 3A and 3B show further examples of the apparatus of FIG. 1.

DETAILED DESCRIPTION

Figure 1:
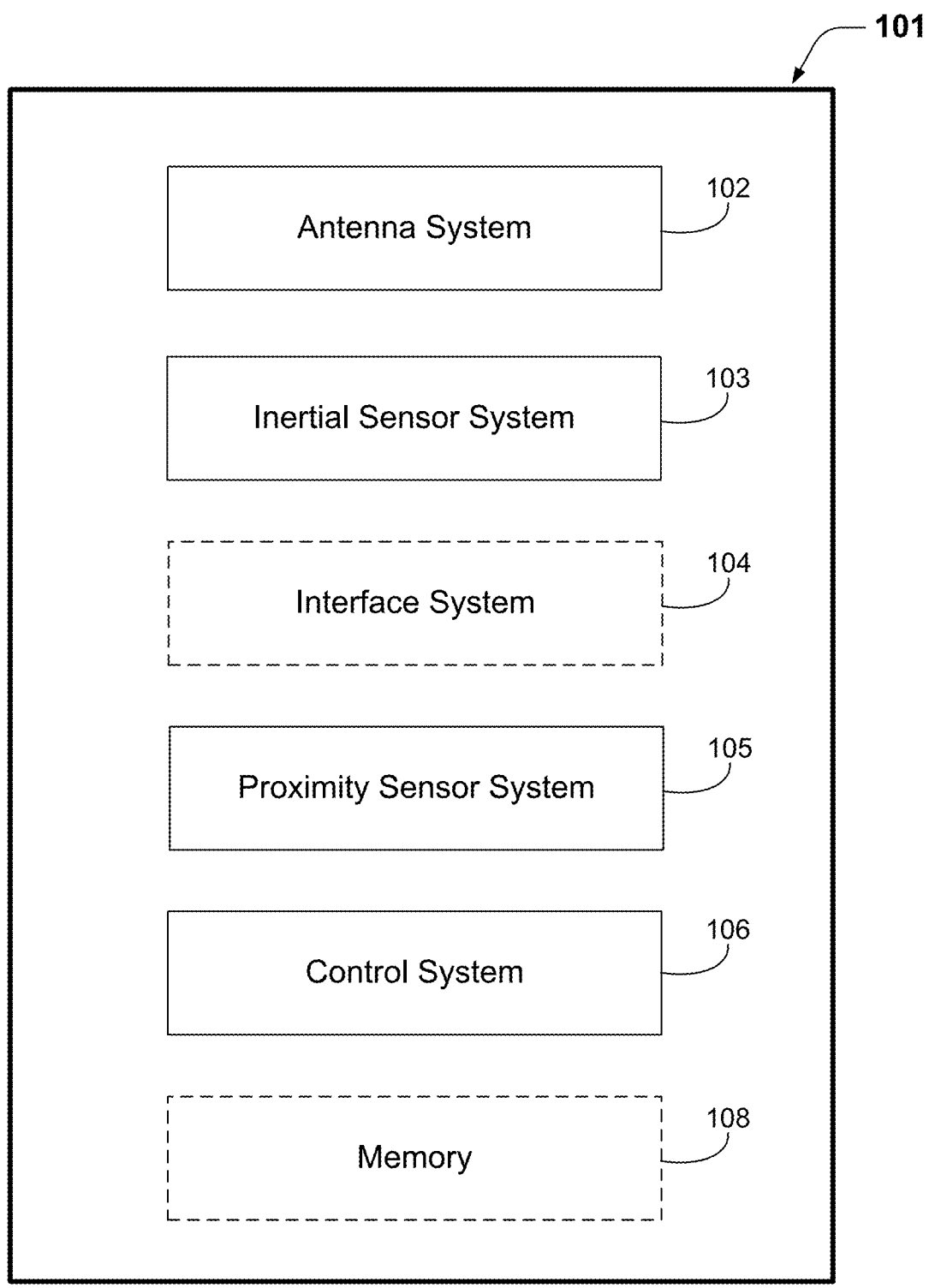
FIG. 1 is a block diagram that shows example components of an apparatus according to some disclosed implementations.

The following description is directed to certain implementations for the purposes of describing the innovative aspects of this disclosure. However, a person having ordinary skill in the art will readily recognize that the teachings herein may be applied in a multitude of different ways. The described implementations may be implemented in any device, apparatus, or system that includes a plurality of transmitter/receiver pairs such as those disclosed herein. In addition, it is contemplated that the described implementations may be included in or associated with a variety of electronic devices such as, but not limited to: mobile telephones, multimedia Internet enabled cellular telephones, mobile television receivers, wireless devices, smartphones, smart cards, wearable devices such as bracelets, armbands, wristbands, rings, headbands, patches, etc., Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), mobile health devices, computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also may be used in applications such as, but not limited to, electronic switching devices, radio frequency filters, sensors, accelerometers, gyroscopes, motion-sensing devices, magnetometers, inertial components for consumer electronics, parts of consumer electronics products, steering wheels or other automobile parts, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

The Maximum Permissible Exposure (MPE) limit may be exceeded when, for example, a device such as a cellular telephone is transmitting at high transmission power. To overcome this potential hazard issue, some 5G transceivers developed by the present assignee include a proximity sensor to detect the presence of nearby targets. If a nearby target is detected, some such devices are configured to reduce their transmission power level.

Such devices are generally capable of detecting nearby targets that are moving relative to the device that includes the proximity sensor(s). However, devices equipped with some such proximity sensors are not capable of determining when the cellular telephone is being held by a user or when the cellular telephone is on the user's body (e.g., in the user's pocket). These limitations could potentially result in human exposure above the MPE limit.

Some disclosed devices include an inertial sensor system, a proximity sensor system, an antenna system configured to transmit and receive radio signals and a control system. The control system may be configured for receiving inertial sensor data from the inertial sensor system and determining whether the inertial sensor data indicates that the device is being held, is being carried or is on a person's body (e.g., is in the person's pocket). In some examples, the control system may be configured for lowering a transmission power of the antenna system if the control system determines that the inertial sensor data indicates that the apparatus is being held, is being carried or is on the person's body. According to some examples, the control system may be configured for deactivating the proximity sensor system if the control system determines that the inertial sensor data indicates that the apparatus is being held, is being carried or is on the person's body.

Particular implementations of the subject matter described in this disclosure may be implemented to realize one or more of the following potential advantages. Some disclosed implementations can enhance user safety by detecting additional instances during which antenna system transmission powers may result in exposure above the MPE limit. Some disclosed implementations may also reduce power consumption by de-activating the proximity sensor system during times when the proximity sensor system may not be able to determine whether a user's body part is near the device.

FIG. 1 is a block diagram that shows example components of an apparatus according to some disclosed implementations. In this example, the apparatus 101 includes an antenna system 102, an inertial sensor system 103, a proximity sensor system 105 and a control system 106. Some implementations of the apparatus 101 may include an interface system 104. In some examples, the apparatus 101 may include a memory 108, in addition to any memory that the control system 106 may include.

Various examples of antenna systems 102 are disclosed herein. In some examples, the antenna system 102 may be implemented via antennas that are configured to transmit and/or receive millimeter wave (mmWave) signals. Some examples of the antenna system 102 may be configurable for use in 5G communication systems, e.g., as set forth in the 3rd Generation Partnership Project (3GPP) fifth generation new radio (5G NR) Releases 15 and 16. In some examples, the antenna system 102 may be configured to transmit at least some radio signals at frequencies of 6 gigahertz (GHz) or more. For example, some such antennas may be configured to transmit beamformed radio signals, e.g., according to instructions from the control system 106. Some disclosed antenna systems 102 may include microstrip antennas (a/k/a "patch" antennas), which can be printed directly onto a circuit board.

Other implementations of the antenna system 102 may include one or more other suitable types of antennas and/or may be configurable for different purposes. For example, in some implementations the antenna system 102 may be configured as a proximity sensor system or an object position estimation system based on mmWave RADAR. Some such implementations may not include a separate proximity sensor system 105. In some such examples, the control system may be configured for obtaining, via a first transmitter/receiver pair of the antenna system 102, a first round-trip time for a first reflection from an object proximate the apparatus and for obtaining, via a second transmitter/receiver pair of the antenna system 102, a second round-trip time for a second reflection from the object. The control system may be configured for determining a position of the object based, at least in part, on the first round-trip time and the second round-trip time. In some implementations, the control system may be configured for determining a first ellipse based on the first round-trip time, for determining a second ellipse based on the second round-trip time and for determining an intersection of the first ellipse and the second ellipse. The position of the object may be based, at least in part, on the intersection of the first ellipse and the second ellipse. According to some such implementations, the control system may be configured for obtaining, via a third transmitter/receiver pair, a third round-trip time for a third reflection from the object and for determining the position of the object based, at least in part, on the first round-trip time, the second round-trip time and the third round-trip time. According to some examples, the control system may be configured for determining a first ellipsoid based on the first round-trip time, determining a second ellipsoid based on the second round-trip time, determining a third ellipsoid based on the third round-trip time and determining an intersection of the first ellipsoid, the second ellipsoid and the third ellipsoid. The position of the object may be based, at least in part, on the intersection of the first ellipsoid, the second ellipsoid and the third ellipsoid. Additional examples are described below with reference to FIG. 10.

In some implementations, the inertial sensor system 103 may include one or more gyroscopes and one or more accelerometers. However, the inertial sensor system 103 may vary according to the particular implementation. Some or all of the sensors in the inertial sensor system 103 may be discrete components or integrated into one or more sensor packages located within a housing of the apparatus 101, depending on the particular implementation. In some implementations, the inertial sensor system 103 may include three linear accelerometers, each of which is configured to measure linear acceleration, velocity and/or displacement along a particular axis of an apparatus coordinate system. In some other implementations, the functions of multiple (e.g., three) linear accelerometers may be integrated into a single (e.g., three-axis) accelerometer. According to some implementations, the inertial sensor system 103 may include three gyroscopes, each of which is configured to measure angular acceleration, angular velocity and/or rotation about a particular axis of an apparatus coordinate system. In some other implementations, the functions of multiple (e.g., three) gyroscopes may be combined or integrated into a single (e.g., three-axis) gyroscope.

The proximity sensor system 105 may include one or more sensors that are configurable to detect objects near the apparatus 101. In some examples, the proximity sensor system 105 may be configured to detect objects within a predetermined distance of the apparatus 101, e.g., within approximately 1 meter, within approximately 50 centimeters, within approximately 20 centimeters, etc. Other implementations of the proximity sensor system 105 may be configured to detect objects within larger or smaller distances of the apparatus 101, e.g., within 5 meters or within 15 centimeters. In some implementations, the proximity sensor system 105 may include one or more transmitters, one or more receivers, or one or more transceivers. According to some implementations, the proximity sensor system 105 may include one or more radio wave transmitters, one or more radio wave receivers, or one or more radio wave transceivers. In some implementations, the proximity sensor system 105 may include one or more acoustic wave transmitters (e.g., one or more ultrasonic transmitters), one or more acoustic wave receivers, or one or more acoustic wave transceivers. Alternatively, or additionally, the proximity sensor system 105 may include one or more other types of sensors, such as optical sensors.

The control system 106 may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. The control system 106 also may include (and/or be configured for communication with) one or more memory devices, such as one or more random access memory (RAM) devices, read-only memory (ROM) devices, etc. Accordingly, the apparatus 101 may have a memory system that includes one or more memory devices, though the memory system 108 is shown as an optional element in FIG. 1. The control system 106 may be capable of receiving and processing data from the antenna system 102, e.g., as described below. In some implementations, functionality of the control system 106 may be partitioned between one or more controllers or processors, such as a dedicated sensor controller and an applications processor of a mobile device.

Some implementations of the apparatus 101 may include an interface system 104. In some examples, the interface system 104 may include a wireless interface system. In some implementations, the interface system 104 may include a user interface system, one or more network interfaces, one or more interfaces between the control system 106 and the optional memory system 108, one or more interfaces between the control system 106 and the antenna system 102, one or more interfaces between the control system 106 and the inertial sensor system 103, one or more interfaces between the control system 106 and the proximity sensor system 105 and/or one or more interfaces between the control system 106 and one or more external device interfaces (e.g., ports or applications processors).

The interface system 104 may be configured to provide communication (which may include wired or wireless communication, such as electrical communication, radio communication, etc.) between components of the apparatus 101 and/or between the apparatus 101 and one or more other devices. In some such examples, the interface system 104 may be configured to provide communication between the control system 106 and the antenna system 102, between the control system 106 and the inertial sensor system 103, and between the control system 106 and the proximity sensor system 105. According to some such examples, a portion of the interface system 104 may couple at least one or more portions of the control system 106 to the antenna system 102, to the inertial sensor system 103 and to the proximity sensor system 105, e.g., via electrically conducting material. According to some examples, the interface system 104 may be configured to provide communication between the apparatus 101 and other devices and/or human beings. In some such examples, the interface system 104 may include one or more user interfaces. The interface system 104 may, in some examples, include one or more network interfaces and/or one or more external device interfaces (such as one or more universal serial bus (USB) interfaces).

The apparatus 101 may be used in a variety of different contexts, some examples of which are disclosed herein. For example, in some implementations a mobile device may include at least a portion of the apparatus 101. The control system 106 may be configured for controlling the antenna system 102 for communication with one or more devices over a network, such as a cellular telephone network, a local area network and/or the Internet. Accordingly, the control system 106 may be configured for controlling the apparatus, including but not limited to the antenna system 102, to provide cellular telephone functionality.

In some implementations, a wearable device may include at least a portion of the apparatus 101. The wearable device may, for example, be a bracelet, an armband, a wristband, a ring, a headband or a patch. In some implementations, the control system 106 may reside in more than one device. For example, a portion of the control system 106 may reside in a wearable device and another portion of the control system 106 may reside in another device, such as a mobile device (e.g., a smartphone or a tablet computer). The interface system 104 also may, in some such examples, reside in more than one device.

Figure 2:
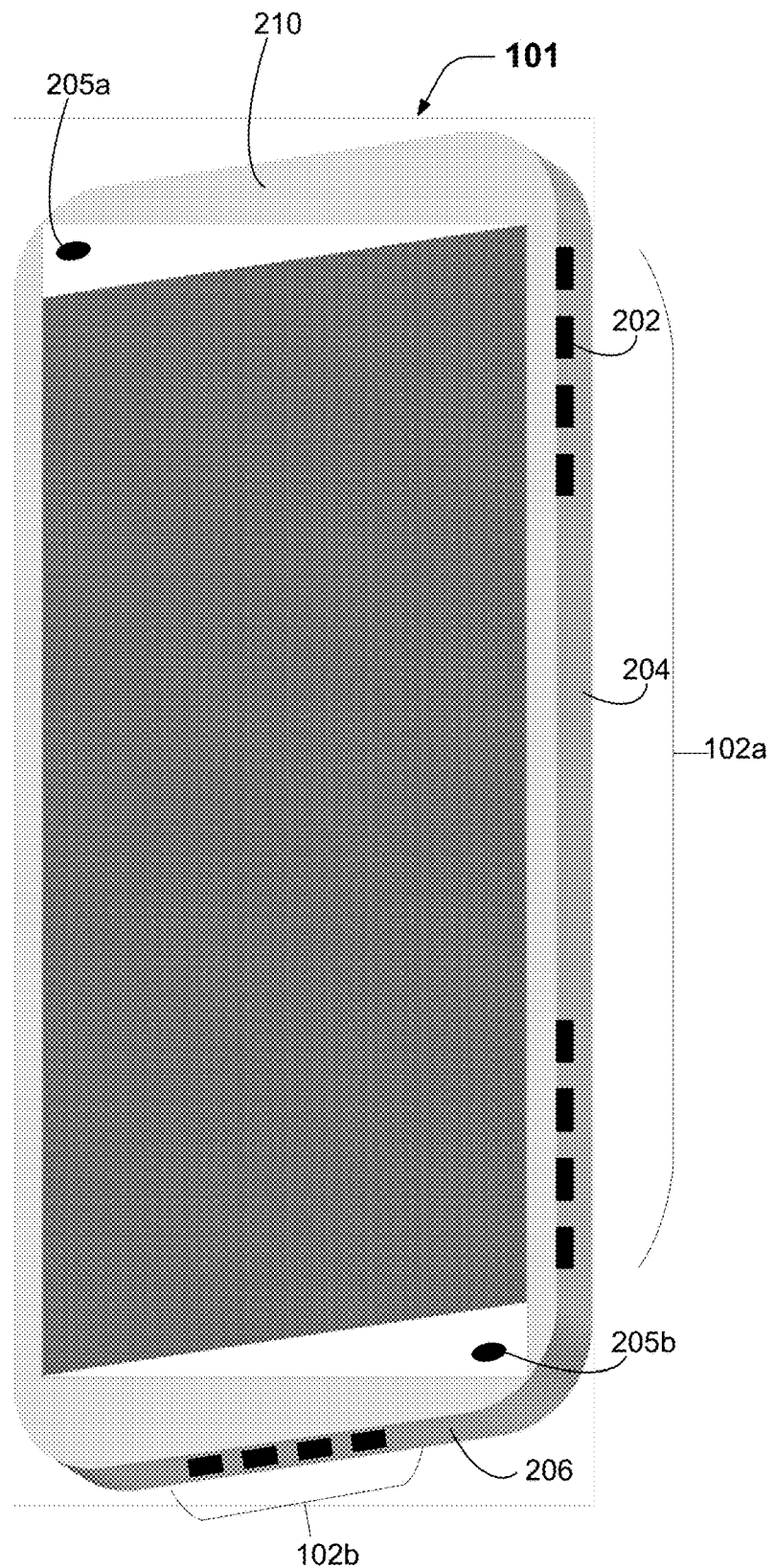
FIG. 2 shows an example of a mobile device implementation of the apparatus of FIG. 1.

FIG. 2 shows an example of a mobile device implementation of the apparatus of FIG. 1. As with other disclosed implementations, the types, numbers and arrangements of elements shown in FIG. 2 are merely made by way of example. In this example, the apparatus 101 includes antenna system portions 102a and 102b, as well as other antenna system portions that are not visible in FIG. 2. In some such examples, the apparatus 101 may include an antenna system portion on a side of the apparatus 101 that is opposite from the side 204 on which the antenna system portion 102a resides. In some such examples, the apparatus 101 may include an antenna system portion on a side of the apparatus 101 that is opposite from the side 206 on which the antenna system portion 102b resides. According to this example, each of the antenna system portions includes multiple antenna elements 202. The multiple antenna elements 202 may, for example, be configurable for beam forming.

According to this implementation, the apparatus 101 includes a proximity sensor system 105 with at least proximity sensor system elements 205a and 205b. According to some implementations, the proximity sensor system 105 may include two or more radio wave transmitters, two or more radio wave receivers, or two or more radio wave transceivers. In some implementations, the proximity sensor system 105 may include two or more acoustic wave transmitters (e.g., one or more ultrasonic transmitters), two or more acoustic wave receivers, or two or more acoustic wave transceivers. In some implementations, the proximity sensor system 105 may also include a RADAR based scheme where the time between the transmitted and reflected pulse is computed to estimate the distance between an object and the apparatus 101. Alternatively, or additionally, the proximity sensor system 105 may include two or more other types of sensors, such as optical sensors. In this example, the apparatus 101 includes an inertial sensor system 103 and a control system 106 that are disposed within the housing 210 and are therefore not visible in FIG. 2.

FIGS. 3A and 3B show further examples of the apparatus of FIG. 1. In the examples of FIGS. 3A and 3B, the inertial sensor system 103 resides within the housing 210 and is therefore not visible from the exterior. Therefore, the inertial sensor system 103 is depicted via dashed lines.

In some implementations, the inertial sensor system 103 shown in FIG. 3A may include three linear accelerometers, each of which is configured to measure linear acceleration, velocity and/or displacement (which may be referred to herein as "displacement data" or "accelerometer data") along a particular x, y or z axis of a Cartesian coordinate system. In some other implementations, the functions of the three linear accelerometers may be combined or integrated into a single three-axis accelerometer.

As shown in FIG. 3B, in some implementations the inertial sensor system 103 may include three gyroscopes, each of which is configured to measure angular acceleration, angular velocity and/or rotation (which may be referred to herein as "rotation data" or "gyroscope data") about a particular axis of an apparatus coordinate system. In some examples, a first gyroscope may be configured to measure rotation data about the x axis, a second gyroscope may be configured to measure rotation data about the y axis a third gyroscope may be configured to measure rotation data about the z axis. Such rotation data also can be expressed in terms of pitch, roll and yaw. In some other implementations, the functions of three gyroscopes may be combined or integrated into a single three-axis gyroscope.

Figure 4:
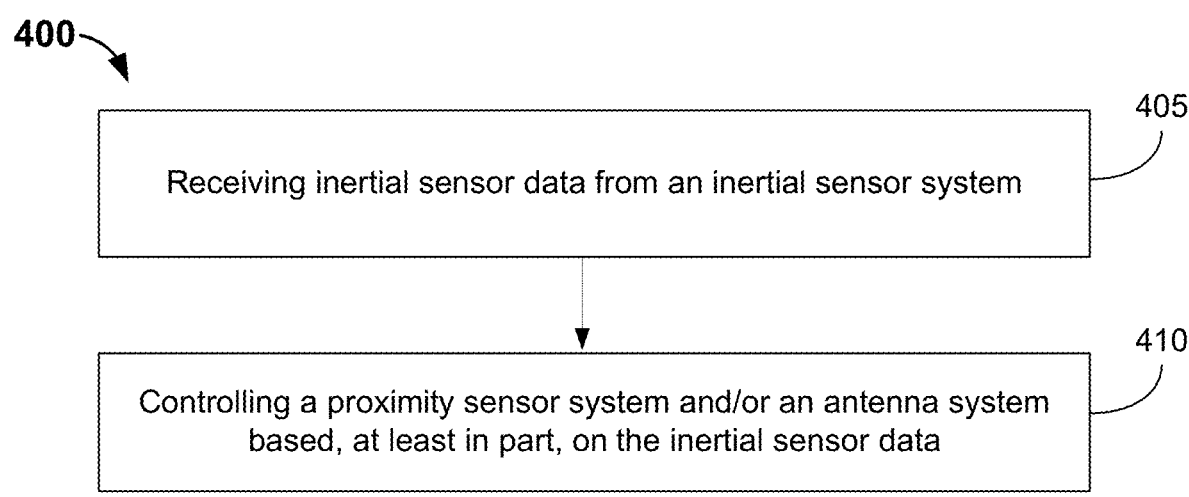
FIG. 4 is a flow diagram that shows blocks of a method according to one example.

FIG. 4 is a flow diagram that shows blocks of a method according to one example. The method 400 may, for example, be implemented at least in part by an apparatus such as the apparatus 101 that is shown in FIG. 1 and described above (or one of the other examples disclosed herein), having an inertial sensor system, a proximity sensor system, an antenna system configured to transmit and receive radio signals, and a control system. As with other disclosed methods, the blocks of method 400 are not necessarily performed in the order shown in FIG. 4. Moreover, alternative methods may include more or fewer blocks.

According to this example, block 405 involves receiving inertial sensor data from the inertial sensor system. Block 405 may, for example, involve the control system 106 of FIG. 1 receiving gyroscope data and/or accelerometer data from the inertial sensor system 103 of FIG. 1.

In this example, block 410 involves controlling the proximity sensor system and/or the antenna system based, at least in part, on the inertial sensor data. In some examples, block 410 may involve determining (e.g., by the control system) whether the inertial sensor data indicates that the apparatus is being held, is being carried or is on a person's body. Some such examples may involve controlling the proximity sensor system and/or the antenna system based, at least in part, on whether the inertial sensor data indicates that the apparatus is being held, is being carried or is on the person's body.

As noted above, the MPE limit may be exceeded when an apparatus, such as a cellular telephone configured for 5G communication, is transmitting at a high transmission power level. In some implementations of the apparatus 101, the control system 106 may be configured to detect the presence of nearby targets (e.g., targets that are within a threshold distance, such as 15 cm, 20 cm, etc.) according to proximity sensor data from the proximity sensor system 105. If a nearby target is detected, the control system 106 may be configured to reduce the transmission power level of the antenna system 102.

Accordingly, some implementations of method 400 may involve determining whether the inertial sensor data indicates that the apparatus is being held, is being carried or is on a person's body and obtaining proximity sensor signals from the proximity sensor system if the control system determines that the inertial sensor data does not indicate that the apparatus is being held, is being carried or is on the person's body. Some such implementations may involve determining whether the proximity sensor signals indicate that a target object is proximate the apparatus (e.g., within a threshold distance, such as 15 cm, 20 cm, etc.) and controlling a transmission power of the antenna system according to whether the control system determines that the target object is proximate the apparatus.

However, some such proximity sensors are not capable of determining, e.g., when the apparatus 101 is being held by a user, is in a user's pocket, etc. In some disclosed implementations, the control system 106 may be configured to reduce power consumption by de-activating the proximity sensor system during times when the proximity sensor system may not be effective or necessary. According to some such examples, block 410 may involve deactivating the proximity sensor system if the control system determines that the inertial sensor data indicates that the apparatus is being held, is being carried or is on a person's body. Alternatively, or additionally, in some examples block 410 may involve lowering a transmission power of the antenna system if the control system determines that the inertial sensor data indicates the apparatus is being held, is being carried or is on a person's body.

FIGS. 5, 6, 7 and 8 are graphs that show examples of inertial sensor data corresponding to various use cases. In FIGS. 5, 6, 7 and 8, the inertial sensor data are accelerometer data corresponding to linear accelerations along the x, y and z axes, as described above with reference to FIG. 3A.

Figure 5:
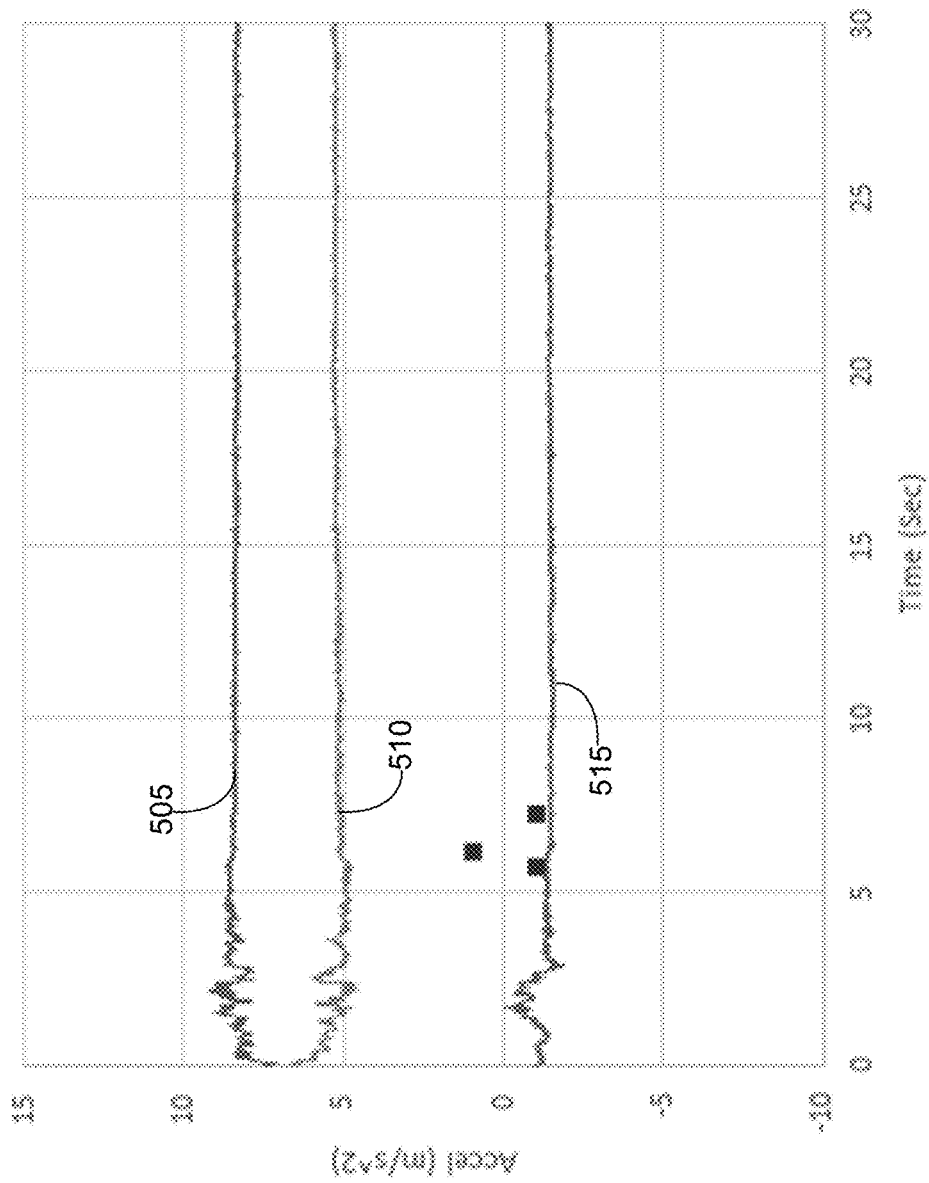
FIGS. 5, 6, 7 and 8 are graphs that show examples of inertial sensor data corresponding to various use cases.

FIG. 5 shows examples of inertial sensor data corresponding to a user picking up a cellular telephone and holding the cellular telephone to the user's head. In the example shown in FIG. 5, element 505 is a plot of linear acceleration along the x axis over a time interval, element 510 is a plot of linear acceleration along the y axis over the same time interval and element 515 is a plot of linear acceleration along the z axis over the same time interval. The largest acceleration values along all axes occur during the first three or four seconds, during which the cellular telephone is being picked up and positioned next to the user's head.

However, even when the cellular telephone is being held next to the user's head, there are still persistent, low-amplitude accelerations along all three axes. Both the higher-amplitude accelerations and the low-amplitude accelerations are examples of inertial sensor data indicating that the apparatus is being held. The persistent, low-amplitude accelerations are examples of what may be referred to herein as tremors or "micro-motions characteristic of human contact." Accordingly, some disclosed methods may involve determining (e.g., by the control system 106) whether inertial sensor data indicates micro-motions characteristic of human contact. Some such methods may involve deactivating the proximity sensor system and/or lowering a transmission power of the antenna system if the control system determines that the inertial sensor data indicates micro-motions characteristic of human contact.

Figure 6:
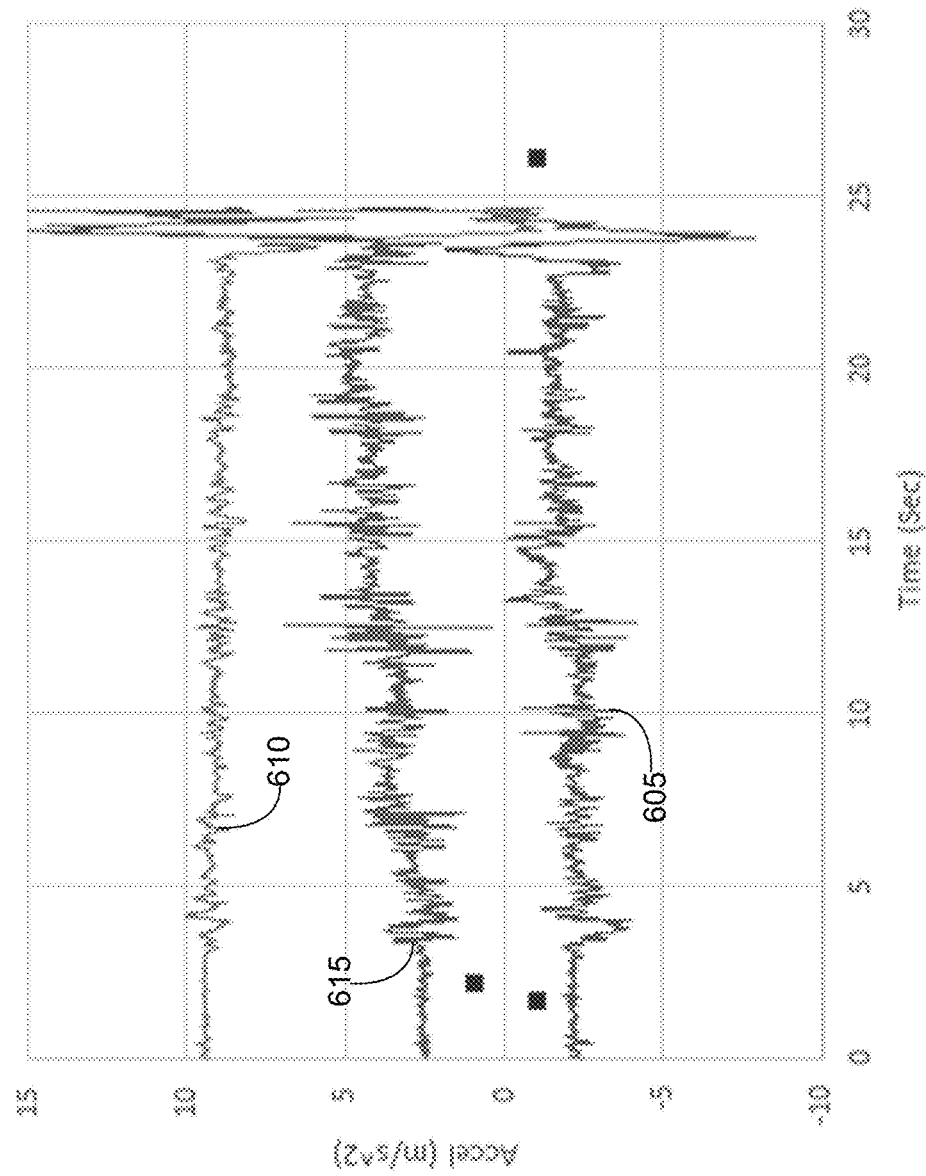

FIG. 6 shows examples of inertial sensor data corresponding to a user walking while holding a cellular telephone. In the example shown in FIG. 6, element 605 is a plot of linear acceleration along the x axis over a time interval, element 610 is a plot of linear acceleration along the y axis over the same time interval and element 615 is a plot of linear acceleration along the z axis over the same time interval. The acceleration values corresponding to walking occur after the first three or four seconds and end at approximately 23 seconds. One may observe that the acceleration values corresponding to a user walking while holding a cellular telephone are significantly greater than the acceleration values corresponding to the user holding the cellular telephone to the user's head. One may also observe that there are relatively larger accelerations along the x axis that correspond in time with relatively larger accelerations along the z axis, e.g., at approximately 10 seconds and at approximately 15 seconds.

Figure 7:
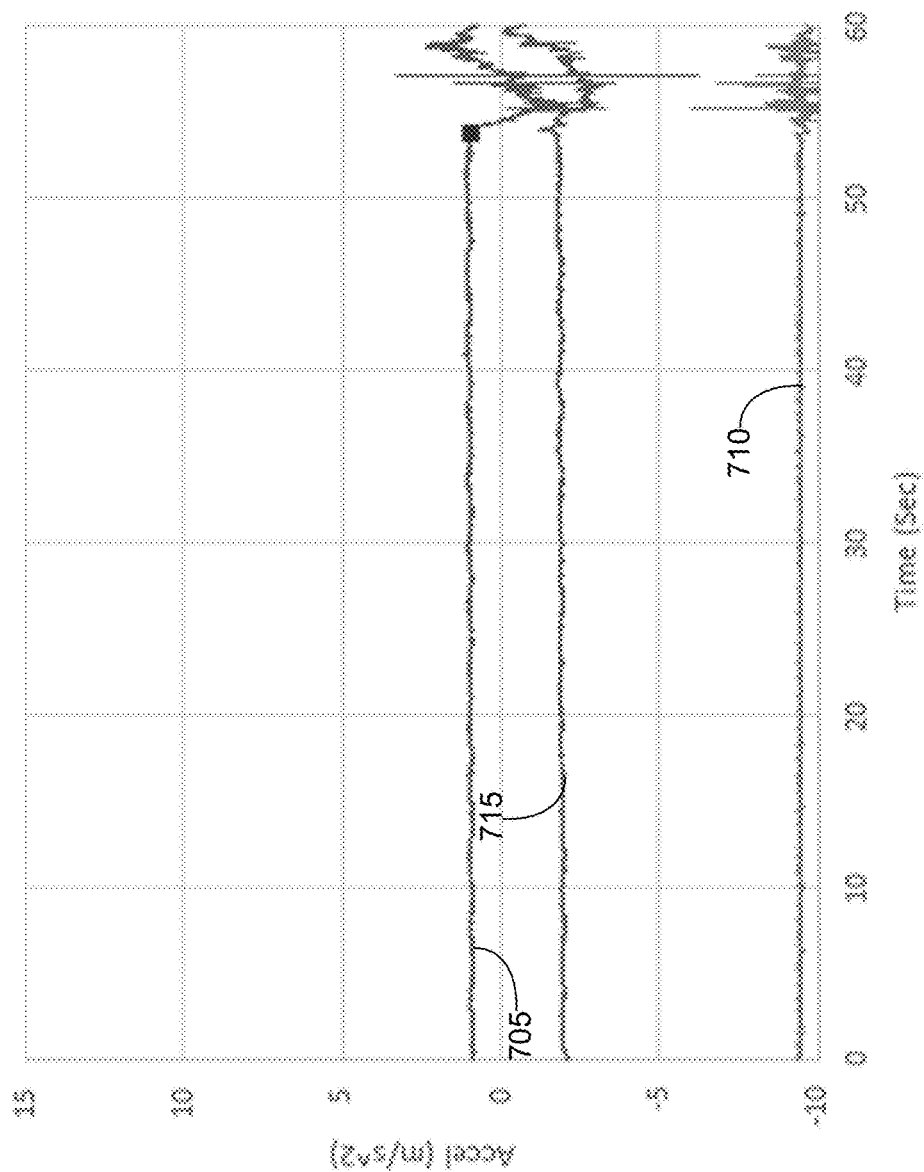

FIG. 7 shows examples of inertial sensor data corresponding to a seated user having a cellular telephone in the user's shirt pocket. In the example shown in FIG. 7, element 705 is a plot of linear acceleration along the x axis over a time interval, element 710 is a plot of linear acceleration along the y axis over the same time interval and element 715 is a plot of linear acceleration along the z axis over the same time interval. FIG. 7 shows additional examples of persistent, low-amplitude accelerations that may be referred to herein as "micro-motions characteristic of human contact." According to some examples, determining whether an apparatus is "on the person's body" may involve determining whether at least some of the apparatus is within the person's pocket.

Figure 8:
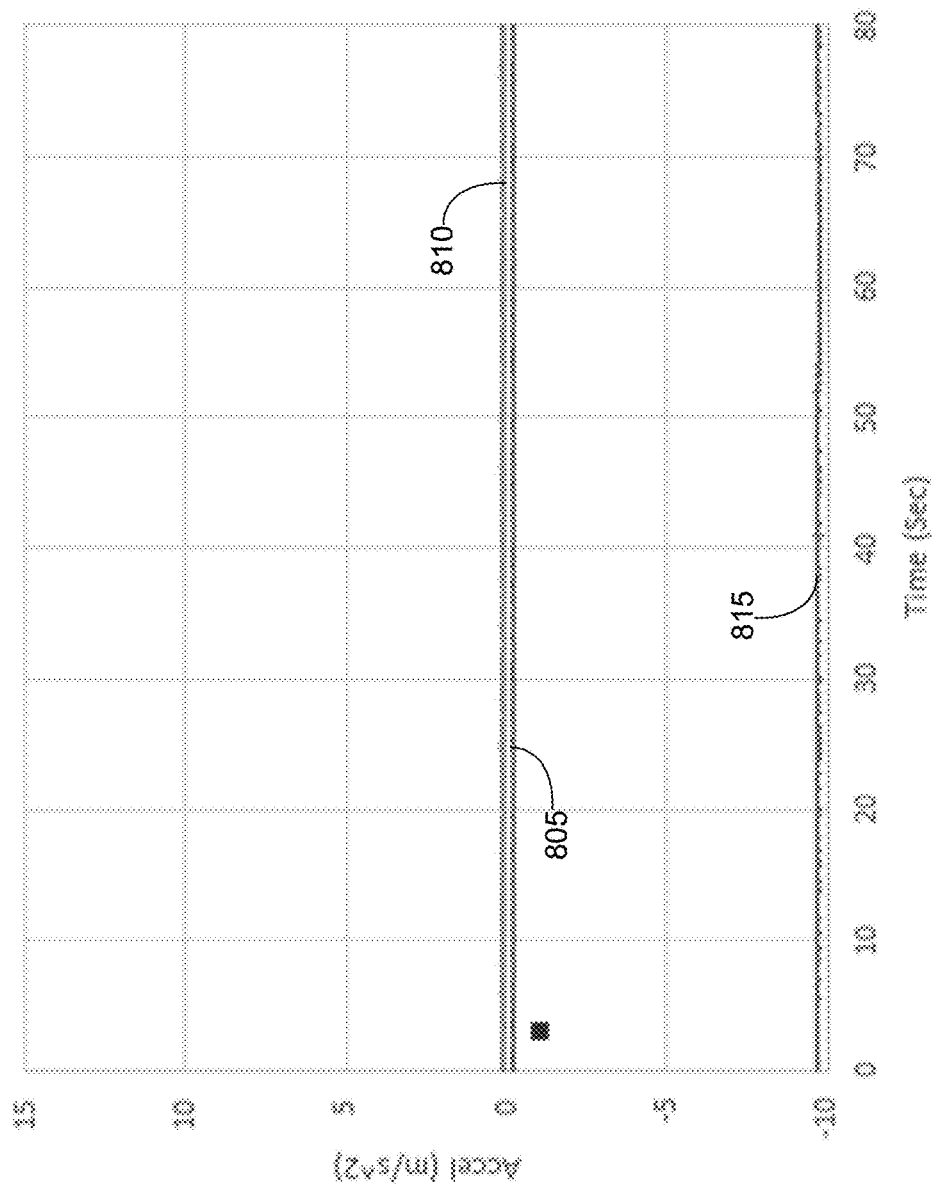

FIG. 8 shows examples of inertial sensor data corresponding to cellular telephone at rest on a table. In the example shown in FIG. 8, element 805 is a plot of linear acceleration along the x axis over a time interval, element 810 is a plot of linear acceleration along the y axis over the same time interval and element 815 is a plot of linear acceleration along the z axis over the same time interval. One may observe that the linear accelerations along the x and y axes are even lower-amplitude than the linear accelerations along the z axis. FIG. 8 shows examples of accelerations that are even lower-amplitude than those referred to herein as "micro-motions characteristic of human contact."

With the acceleration data of FIGS. 5-8 in mind, one may see that accelerations equal to or exceeding an acceleration threshold (such as a maximum acceleration of the "at rest" cellular telephone of FIG. 8) may, in some instances, indicate the apparatus is being held, is being carried or is on a person's body. Accordingly, some disclosed methods may involve determining (e.g., by the control system) whether the inertial sensor data indicates accelerations equal to or exceeding an acceleration threshold. According to some such examples, the method may involve deactivating the proximity sensor system and/or lowering a transmission power of the antenna system if the control system determines that the inertial sensor data indicates accelerations equal to or exceeding the acceleration threshold. However, the method may involve activating the proximity sensor system, allowing the proximity sensor system to remain active and/or allowing a transmission power of the antenna system to be optimized for cellular communication if the control system determines that the inertial sensor data does not indicate accelerations equal to or exceeding the acceleration threshold.

Some disclosed methods may involve characterizing inertial sensor data, e.g., by applying some form of artificial intelligence to make correlations between types of inertial sensor data and different device use cases. Some disclosed methods may, for example, involve determining whether inertial sensor data indicates micro-motions characteristic of human contact.

For example, some disclosed methods may involve training a neural network to determine whether or not inertial sensor data indicates that an apparatus is being held, is being carried or is on a person's body. In some such examples, the neural network may be trained by inputting sets of inertial sensor data, such as that shown in FIGS. 5-8, and indicating the use case corresponding to each of the sets of input inertial sensor data. Some disclosed methods may involve implementing (e.g., via the control system 106) a neural network trained to determine whether the inertial sensor data indicates that the apparatus is being held, is being carried or is on a person's body. Some such methods may involve deactivating a proximity sensor system and/or lowering a transmission power of an antenna system if the control system determines that the inertial sensor data indicates that the apparatus is being held, is being carried, or is on the person's body.

Figure 9:
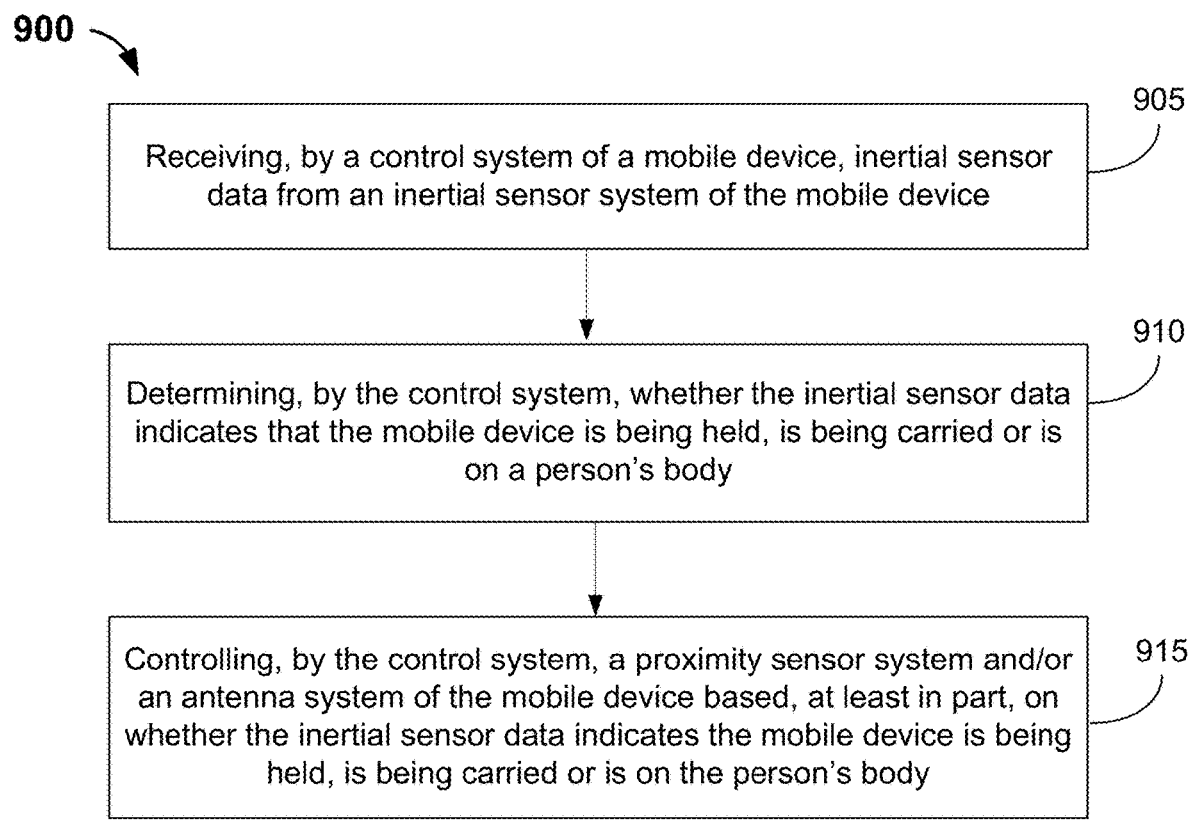
FIG. 9 is a flow diagram that shows blocks of a method of controlling a mobile device according to one example.

FIG. 9 is a flow diagram that shows blocks of a method of controlling a mobile device according to one example. The method 900 may, for example, be implemented at least in part by an apparatus such as the apparatus 101 that is shown in FIG. 1 and described above (or one of the other examples disclosed herein), having an inertial sensor system, a proximity sensor system, an antenna system configured to transmit and receive radio signals and a control system. As with other disclosed methods, the blocks of method 900 are not necessarily performed in the order shown in FIG. 9. Moreover, alternative methods may include more or fewer blocks.

According to this example, block 905 involves receiving by a control system of a mobile device, inertial sensor data from an inertial sensor system of the mobile device. Block 905 may, for example, involve the control system 106 of FIG. 1 receiving gyroscope data and/or accelerometer data from the inertial sensor system 103 of FIG. 1.

In this example, block 910 involves determining (e.g., by the control system) whether the inertial sensor data indicates that the mobile device is being held, is being carried or is on a person's body. According to this example, block 915 involves controlling the proximity sensor system and/or the antenna system based, at least in part, on whether the inertial sensor data indicates that the mobile device is being held, is being carried or is on the person's body.

In some examples, method 900 may involve deactivating, by the control system, the proximity sensor system if the control system determines that the inertial sensor data indicates that the mobile device is being held, is being carried or is on the person's body. Alternatively, or additionally, method 900 may involve lowering a transmission power of the antenna system if the control system determines that the inertial sensor data indicates that the mobile device is being held, is being carried or is on the person's body. In some instances, determining whether the mobile device is on the person's body involves determining whether at least some of the mobile device is within the person's pocket.

According to some examples, method 900 may involve obtaining proximity sensor signals from the proximity sensor system if the control system determines that the inertial sensor data does not indicate that the mobile device is being held, is being carried or is on the person's body. Some such methods may involve determining whether the proximity sensor signals indicate that a target object is proximate the mobile device and controlling a transmission power of the antenna system according to whether the control system determines that the target object is proximate the mobile device.

In some examples, method 900 may involve determining whether the inertial sensor data indicates accelerations equal to or exceeding an acceleration threshold. Some such methods may involve deactivating the proximity sensor system and/or lowering a transmission power of the antenna system if the control system determines that the inertial sensor data indicates accelerations equal to or exceeding the acceleration threshold.

According to some examples, method 900 may involve determining whether the inertial sensor data indicates micro-motions characteristic of human contact. Some such methods may involve deactivating the proximity sensor system and lowering a transmission power of the antenna system if the control system determines that the inertial sensor data indicates micro-motions characteristic of human contact.

According to some examples, method 900 may involve implementing a neural network trained to determine whether the inertial sensor data indicates micro-motions characteristic of human contact. According to some such examples, the method may involve deactivating the proximity sensor system and/or lowering a transmission power of the antenna system if the control system determines that the inertial sensor data indicates micro-motions characteristic of human contact.

In some examples, method 900 may involve implementing a neural network trained to determine whether the inertial sensor data indicates that the apparatus is being held, is being carried or is on a person's body. According to some such examples, the method may involve deactivating the proximity sensor system and/or lowering a transmission power of the antenna system if the control system determines that the inertial sensor data indicates that the apparatus is being held, is being carried or is on the person's body.

Figure 10:
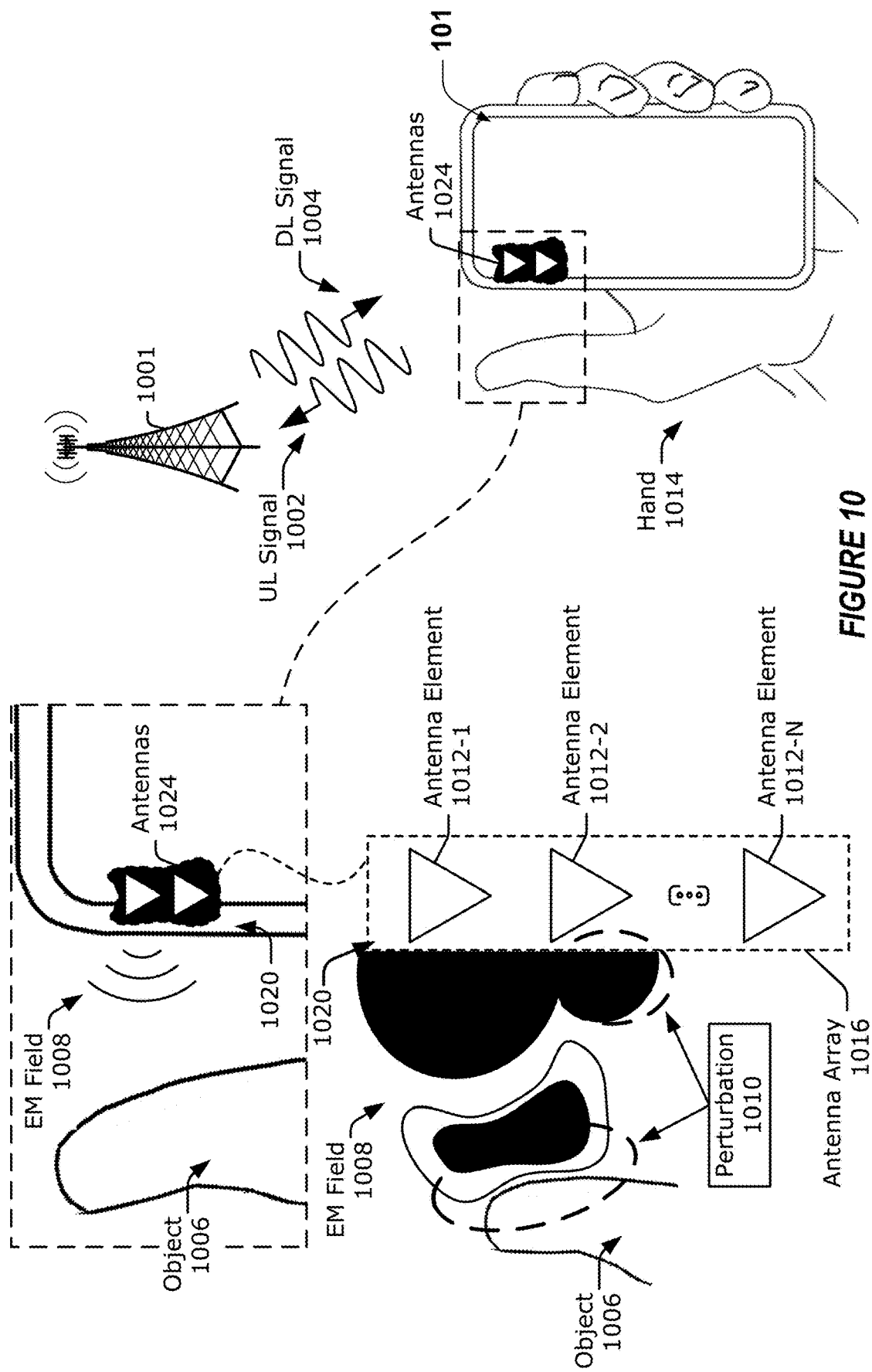
FIG. 10 illustrates an example operating environment 1000 for proximity detection based on an electromagnetic field perturbation.

FIG. 10 illustrates an example operating environment 1000 for proximity detection based on an electromagnetic field perturbation. In the example environment 1000, a hand 1014 of a user holds an implementation the apparatus 101 that is described above with reference to FIG. 1. In one aspect, the apparatus 101 communicates with the base station 1001 by transmitting an uplink signal 1002 (UL signal 1002) or receiving a downlink signal 1004 (DL signal 1004) via the antennas 1024. A user's thumb, however, may represent a proximate object 1006 that may be exposed to radiation via the uplink signal 1002.

To detect whether the object 1006 exists or is within a detectable range, the apparatus 101 generates an electromagnetic (EM) field 1008 via at least one of the antennas 1024. The electromagnetic field 1008 can be generated by transmitting a predetermined proximity detection signal or the uplink signal 1002. In some cases, the proximity detection signal may be generated such that it includes a single frequency or tone or multiple frequencies or tones. For example, the proximity detection signal can include an orthogonal frequency-division multiplexing (OFDM) signal having multiple sub-carriers of different frequencies. As another example, the proximity detection signal can include a frequency-modulated continuous wave (FMCW) signal (e.g., a linear frequency-modulated (LFM) continuous wave signal or chirp signal, a triangular frequency-modulated continuous wave signal, a sawtooth frequency-modulated continuous wave signal, and so forth). As yet another example, the proximity detection signal can include a continuous-wave signal having a relatively constant frequency.

In FIG. 10, a resulting amplitude of the electromagnetic field 1008 is represented with different shades of grey, where darker shades represent higher amplitudes and lighter shades represent lower amplitudes. If the object 1006 is proximate to another one of the antennas 1024, interactions of the object 1006 with the electromagnetic field 1008 produce one or more perturbations (e.g., disturbances or changes) in the electromagnetic field 1008, such as perturbation 1010. The perturbation 1010 represents a variation in a magnitude or phase of the electromagnetic field 1008 due to the object 1006 causing different constructive or destructive patterns to occur within the electromagnetic field 1008.

In some implementations, the antennas 1024 may comprise at least two different antennas, at least two antenna elements 1012 of an antenna array 1016, at least two antenna elements 1012 associated with different antenna arrays 1016, or any combination thereof. As shown in FIG. 10, the antennas 1024 correspond to at least two of the antenna elements 1012 within the antenna array 1016. The antenna array 1016 can include multiple antenna elements 1012-1 to 1012-N, where N represents a positive integer greater than one. In the depicted example, a first antenna element 1012 1 emits the electromagnetic field 1008 and the perturbation 1010 is sensed via a second antenna element 1012-2. The second antenna element 1012-2 may be co-located with respect to the first antenna element 1012-1 as part of the antenna array 1016 or otherwise proximate to the first antenna element 1012-1. In some cases, the second antenna element 1012-2 is adjacent to the first antenna element 1012-1 within a same antenna array 1016 (e.g., there are no antenna elements 1012 physically located between the first antenna element 1012-1 and the second antenna element 1012-2). A distance between the antenna elements 1012 in the antenna array 1016 can be based on frequencies that the wireless transceiver 1020 emits. For example, the antenna elements 1012 in the antenna array 1016 can be spaced by approximately half a wavelength from each other (e.g., by approximately a centimeter (cm) apart for frequencies around 30 GHz).

A response of the second antenna element 1012-2 to the electromagnetic field 1008 is affected by the object 1006 reflecting or absorbing the electromagnetic field 1008 and also by any mutual coupling or interference produced by the first antenna element 1012-1. In general, energy from the electromagnetic field 1008 induces a current in the second antenna element 1012 2, which is used to measure the perturbation 1010 or the resulting electromagnetic field 1008 that is disturbed by the object 1006. By sensing the perturbation 1010, a determination can be made as to whether the object 1006 is present or outside a detectable range (e.g., not present). The detectable range may be within approximately 40 cm from the antennas 1024, between 0 and 10 cm from the antennas 1024, and so forth. In general, the detectable range can vary based on transmission power or sensitivity of the wireless transceiver 1020. A duration for which the electromagnetic field 1008 is generated can also be based on the detectable range. Example durations can range from approximately one microsecond to several tens of microseconds.

In some cases, the detectable range can include ranges that are not readily measured using radar-based techniques. For example, the radar-based techniques can be limited to ranges that are farther than a minimum range, which is proportional to a bandwidth of the FMCW signal. Example minimum ranges include 4 cm or 2 cm for a FMCW signal having a bandwidth of 4 GHz or 8 GHz, respectively. Therefore, to detect closer distances using radar-based techniques, the wireless transceiver 1020 generates larger bandwidth signals at an expense of increased design complexity or increased cost of the wireless transceiver 1020. Using the described techniques, however, the range to the object 1006 can be measured at distances closer than these minimum ranges. In this way, the described techniques can be used to augment close-range detection even if radar-based techniques are used for far-range detection.

In some implementations, the wireless transceiver 1020 can generate the electromagnetic field 1008 via the first antenna element 1012-1 during a same time that the second antenna element 1012-2 is used to sense the electromagnetic field 1008. The antennas 1024 and/or elements thereof may be implemented using any type of antenna, including patch antennas, dipole antennas, bowtie antennas, or a combination thereof.

Implementation examples are described in the following numbered clauses:

1. An apparatus, comprising: an inertial sensor system including at least one inertial sensor; a proximity sensor system including at least one proximity sensor; an antenna system configured to transmit and receive radio signals; and a control system configured for: receiving inertial sensor data from the inertial sensor system; and controlling the proximity sensor system and the antenna system based, at least in part, on the inertial sensor data.

2. The apparatus of clause 1, wherein the control system is further configured for: determining whether the inertial sensor data indicates that the apparatus is being held, is being carried or is on a person's body; and deactivating the proximity sensor system if the control system determines that the inertial sensor data indicates that the apparatus is being held, is being carried or is on the person's body.

3. The apparatus of clause 2, wherein the control system is further configured for lowering a transmission power of the antenna system if the control system determines that the inertial sensor data indicates that the apparatus is being held, is being carried or is on the person's body.

4. The apparatus of clause 2, wherein determining whether the apparatus is on the person's body involves determining whether at least some of the apparatus is within a pocket of the person.

5. The apparatus of any of clauses 1-4, wherein the control system is further configured for: determining whether the inertial sensor data indicates that the apparatus is being held, is being carried or is on a person's body; obtaining proximity sensor signals from the proximity sensor system if the control system determines that the inertial sensor data does not indicate that the apparatus is being held, is being carried or is on the person's body; determining whether the proximity sensor signals indicate that a target object is proximate the apparatus; and controlling a transmission power of the antenna system according to whether the control system determines that the target object is proximate the apparatus.

6. The apparatus of any of clauses 1-5, wherein the proximity sensor system includes at least one radar sensor.

7. The apparatus of any of clauses 1-6, wherein the antenna system is configured to transmit at least some radio signals at frequencies of 6 gigahertz or more.

8. The apparatus of any of clauses 1-7, wherein the antenna system is configured to transmit beamformed radio signals.

9. The apparatus of any of clauses 1-8, wherein the control system is further configured for: determining whether the inertial sensor data indicates accelerations equal to or exceeding an acceleration threshold; and deactivating the proximity sensor system and lowering a transmission power of the antenna system if the control system determines that the inertial sensor data indicates one or more accelerations equal to or exceeding the acceleration threshold.

10. The apparatus of any of clauses 1-9, wherein the control system is further configured for: determining whether the inertial sensor data indicates micro-motions characteristic of human contact; and deactivating the proximity sensor system and lowering a transmission power of the antenna system if the control system determines that the inertial sensor data indicates one or more micro-motions characteristic of human contact.

11. The apparatus of any of clauses 1-10, wherein the control system is further configured for: implementing, via the control system, a neural network trained to determine whether the inertial sensor data indicates that the apparatus is being held, is being carried or is on a person's body; and deactivating the proximity sensor system and lowering a transmission power of the antenna system if the control system determines that the inertial sensor data indicates that the apparatus is being held, is being carried, or is on the person's body.

12. The apparatus of any of clauses 1-11, wherein the inertial sensor system includes at least one accelerometer or at least one gyroscope.

13. The apparatus of any of clauses 1-12, wherein the apparatus is a mobile device.

14. An method of controlling a mobile device, comprising: receiving, by a control system of the mobile device, inertial sensor data from an inertial sensor system of the mobile device; determining, by the control system, whether the inertial sensor data indicates that the mobile device is being held, is being carried or is on a person's body; and controlling, by the control system, a proximity sensor system and an antenna system of the mobile device based, at least in part, on whether the inertial sensor data indicates the mobile device is being held, is being carried or is on the person's body.

15. The method of clause 14, further comprising deactivating, by the control system, the proximity sensor system if the control system determines that the inertial sensor data indicates that the mobile device is being held, is being carried or is on the person's body.

16. The method of clause 15, further comprising lowering a transmission power of the antenna system if the control system determines that the inertial sensor data indicates that the mobile device is being held, is being carried or is on the person's body.

17. The method of clause 15 or clause 16, wherein determining whether the mobile device is on the person's body involves determining whether at least some of the mobile device is within a pocket of the person.

18. The method of any of clauses 14-17, wherein the method further comprises: obtaining proximity sensor signals from the proximity sensor system if the control system determines that the inertial sensor data does not indicate that the mobile device is being held, is being carried or is on the person's body; determining whether the proximity sensor signals indicate that a target object is proximate the mobile device; and controlling a transmission power of the antenna system according to whether the control system determines that the target object is proximate the mobile device.

19. The method of any of clauses 14-18, wherein the method further comprises: determining whether the inertial sensor data indicates accelerations equal to or exceeding an acceleration threshold; and deactivating the proximity sensor system and lowering a transmission power of the antenna system if the control system determines that the inertial sensor data indicates one or more accelerations equal to or exceeding the acceleration threshold.

20. The method of any of clauses 14-19, wherein the method further comprises: determining whether the inertial sensor data indicates micro-motions characteristic of human contact; and deactivating the proximity sensor system and lowering a transmission power of the antenna system if the control system determines that the inertial sensor data indicates one or more micro-motions characteristic of human contact.

21. The method of any of clauses 14-20, wherein the method further comprises: implementing a neural network trained to determine whether the inertial sensor data indicates that the mobile device is being held, is being carried or is on the person's body; and deactivating the proximity sensor system and lowering a transmission power of the antenna system if the control system determines that the inertial sensor data indicates that the mobile device is being held, is being carried, or is on the person's body.

22. One or more non-transitory media having software stored thereon, the software including instructions for implementing a method of controlling a mobile device, the method comprising: receiving, by a control system of the mobile device, inertial sensor data from an inertial sensor system of the mobile device; determining, by the control system, whether the inertial sensor data indicates that the mobile device is being held, is being carried or is on a person's body; and controlling, by the control system, a proximity sensor system and an antenna system of the mobile device based, at least in part, on whether the inertial sensor data indicates the mobile device is being held, is being carried or is on the person's body.

23. The one or more non-transitory media of clause 22, wherein the method involves deactivating, by the control system, the proximity sensor system if the control system determines that the inertial sensor data indicates that the mobile device is being held, is being carried or is on the person's body.

24. The one or more non-transitory media of clause 22 or clause 23, wherein the method involves lowering a transmission power of the antenna system if the control system determines that the inertial sensor data indicates that the mobile device is being held, is being carried or is on the person's body.

25. The one or more non-transitory media of any of clauses 22-24, wherein determining whether the mobile device is on the person's body involves determining whether at least some of the mobile device is within a pocket of the person.

26. The one or more non-transitory media of any of clauses 22-25, wherein the method involves: obtaining proximity sensor signals from the proximity sensor system if the control system determines that the inertial sensor data does not indicate that the mobile device is being held, is being carried or is on the person's body; determining whether the proximity sensor signals indicate that a target object is proximate the mobile device; and controlling a transmission power of the antenna system according to whether the control system determines that the target object is proximate the mobile device.

27. An apparatus, comprising: an inertial sensor system including at least one inertial sensor; a proximity sensor system including at least one proximity sensor; an antenna system configured to transmit and receive radio signals; and control means for: receiving inertial sensor data from the inertial sensor system; and controlling the proximity sensor system and the antenna system based, at least in part, on the inertial sensor data.

28. The apparatus of clause 27, wherein the control means includes means for: determining whether the inertial sensor data indicates that the apparatus is being held, is being carried or is on a person's body; and deactivating the proximity sensor system if the control means determines that the inertial sensor data indicates that the apparatus is being held, is being carried or is on the person's body.

29. The apparatus of clause 28, wherein the control means includes means for lowering a transmission power of the antenna system if the control means determines that the inertial sensor data indicates that the apparatus is being held, is being carried or is on the person's body.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module which may reside on a computer-readable medium. Computer-readable media include both computer storage media and communication media including any medium that may be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those having ordinary skill in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein, if at all, to mean "serving as an example, instance, or illustration." Any implementation described herein as "exemplary" is not necessarily to be construed as preferred or advantageous over other implementations.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

It will be understood that unless features in any of the particular described implementations are expressly identified as incompatible with one another or the surrounding context implies that they are mutually exclusive and not readily combinable in a complementary and/or supportive sense, the totality of this disclosure contemplates and envisions that specific features of those complementary implementations may be selectively combined to provide one or more comprehensive, but slightly different, technical solutions. It will therefore be further appreciated that the above description has been given by way of example only and that modifications in detail may be made within the scope of this disclosure.

The invention claimed is:

1. An apparatus, comprising:
an inertial sensor system including at least one inertial sensor;
a proximity sensor system including at least one proximity sensor;
an antenna system configured to transmit and receive radio signals; and
a control system configured for:
receiving inertial sensor data from the inertial sensor system;
determining whether the inertial sensor data indicates that the apparatus is being held, is being carried or is on a person's body; and
deactivating the proximity sensor system in accordance with a maximum permissible exposure limit associated with the apparatus and responsive to determining that the inertial sensor data indicates that the apparatus is being held, is being carried or is on the person's body.

2. The apparatus of claim 1, wherein the control system is further configured for lowering a transmission power of the antenna system or ceasing transmission by the antenna system if the control system determines that the inertial sensor data indicates that the apparatus is being held, is being carried or is on the person's body.

3. The apparatus of claim 1, wherein determining whether the apparatus is on the person's body involves determining whether at least some of the apparatus is within a pocket of the person.

4. The apparatus of claim 1, wherein the proximity sensor system includes at least one radar sensor.

5. The apparatus of claim 1, wherein the antenna system is configured to transmit at least some radio signals at frequencies of 6 gigahertz or more.

6. The apparatus of claim 1, wherein the antenna system is configured to transmit beamformed radio signals.

7. The apparatus of claim 1, wherein the control system is further configured for:
determining whether the inertial sensor data indicates accelerations equal to or exceeding an acceleration threshold; and
deactivating the proximity sensor system if the control system determines that the inertial sensor data indicates one or more accelerations equal to or exceeding the acceleration threshold.

8. The apparatus of claim 1, wherein determining that the inertial sensor data indicates that the apparatus is being held, is being carried or is on the person's body involves determining whether the inertial sensor data indicates micromotions characteristic of human contact.

9. The apparatus of claim 1, wherein the control system is further configured for
implementing, via the control system, a neural network trained to determine whether the inertial sensor data indicates that the apparatus is being held, is being carried or is on a person's body.

10. The apparatus of claim 1, wherein the inertial sensor system includes at least one accelerometer or at least one gyroscope.

11. The apparatus of claim 1, wherein the apparatus is a mobile device.

12. A method of controlling a mobile device, comprising:
receiving, by a control system of the mobile device, inertial sensor data from an inertial sensor system of the mobile device;
determining, by the control system, whether the inertial sensor data indicates that the mobile device is being held, is being carried or is on a person's body; and
deactivating, by the control system, a proximity sensor system of the mobile device based, at least in part, on a maximum permissible exposure limit associated with the mobile device and whether the inertial sensor data indicates the mobile device is being held, is being carried or is on the person's body.

13. The method of claim 12, further comprising lowering a transmission power of an antenna system or ceasing antenna transmissions if the control system determines that the inertial sensor data indicates that the mobile device is being held, is being carried or is on the person's body.

14. The method of claim 12, wherein determining whether the mobile device is on the person's body involves determining whether at least some of the mobile device is within a pocket of the person.

15. The method of claim 12, wherein determining whether the mobile device is on the person's body involves determining whether the inertial sensor data indicates accelerations equal to or exceeding an acceleration threshold.

16. The method of claim 12, wherein the method further comprises implementing a neural network trained to determine whether the inertial sensor data indicates that the mobile device is being held, is being carried or is on the person's body.

17. One or more non-transitory media having software stored thereon, the software including instructions for implementing a method of controlling a mobile device, the method comprising:
receiving, by a control system of the mobile device, inertial sensor data from an inertial sensor system of the mobile device;
determining, by the control system, whether the inertial sensor data indicates that the mobile device is being held, is being carried or is on a person's body; and
deactivating, by the control system, a proximity sensor system of the mobile device based, at least in part, on a maximum permissible exposure limit associated with the mobile device and whether the inertial sensor data indicates the mobile device is being held, is being carried or is on the person's body.

18. The one or more non-transitory media of claim 17, wherein the method involves lowering a transmission power of an antenna system if the control system determines that the inertial sensor data indicates that the mobile device is being held, is being carried or is on the person's body.

19. An apparatus, comprising:
- an inertial sensor system including at least one inertial sensor;
- a proximity sensor system including at least one proximity sensor;
- an antenna system configured to transmit and receive radio signals; and
- control means for:
  - receiving inertial sensor data from the inertial sensor system;
  - determining whether the inertial sensor data indicates that the apparatus is being held, is being carried or is on a person's body; and
  - deactivating the proximity sensor system in accordance with a maximum permissible exposure limit associated with the apparatus and responsive to determining that the inertial sensor data indicates that the apparatus is being held, is being carried or is on the person's body.

20. The apparatus of claim 19, wherein the control means includes means for lowering a transmission power of the antenna system if the control means determines that the inertial sensor data indicates that the apparatus is being held, is being carried or is on the person's body.

* * * * *